J. Bt. LEMIEUX.
Jack-Chain for Saw-Mills.
No. 208,321. Patented Sept. 24, 1878.
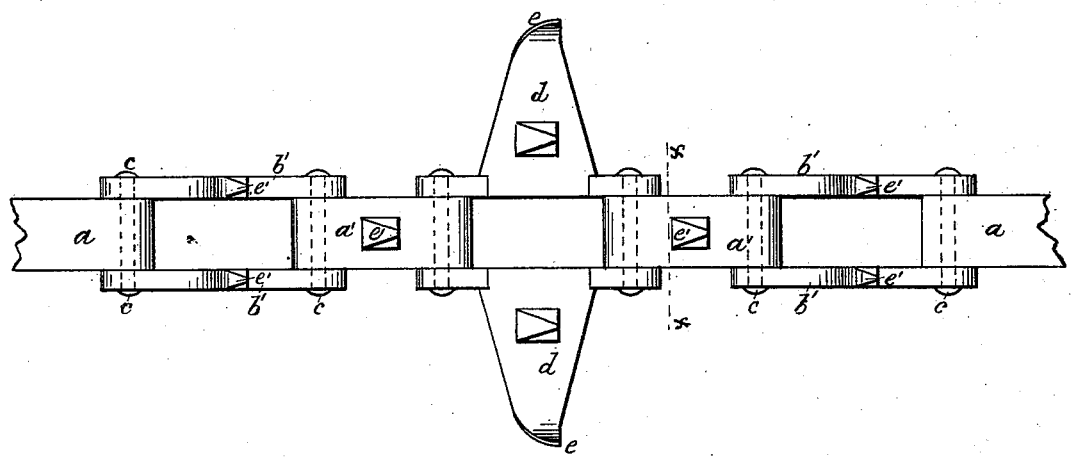
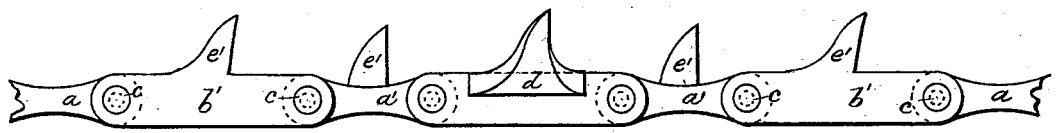
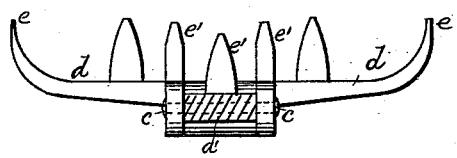
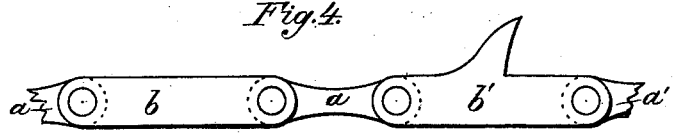

UNITED STATES PATENT OFFICE.

JOHN BT. LEMIEUX, OF MUSKEGON, MICHIGAN, ASSIGNOR OF ONE-HALF HIS RIGHT TO ALEXANDER RODGERS, OF SAME PLACE.

IMPROVEMENT IN JACK-CHAINS FOR SAW-MILLS.

Specification forming part of Letters Patent No. 208,321, dated September 24, 1878; application filed July 11, 1878.

*To all whom it may concern:*

Be it known that I, JOHN BT. LEMIEUX, of Muskegon, in the county of Muskegon and State of Michigan, have invented certain new and useful Improvements in Jack-Chains; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to that class of chains employed in saw-mills for drawing logs from the water up into the mill, and usually called "jacking-chains," the object being to avoid the loss of time required by the ordinary method of driving dogs attached to short pieces of chain into the log and then attaching these to the jacking-chain, and also prevent the loss of lumber caused by the splitting of the logs by the dogs; and the invention consists in providing the chain with curved and toothed saddles and toothed links placed at intervals, as will be hereinafter fully described.

In the drawings, Figure 1 is a plan; Fig. 2, a side view, and Fig. 3 a section on the line $x\ x$ of Fig. 1. Fig. 4 is a side view of a plain and spurred link.

The body of the chain is formed of solid straight links $a$, coupled together by plain side links $b$ and suitable bolts or rivets $c$, which pass through holes in the ends of the links. At suitable intervals in the length of the chain are placed the toothed side links $b'$, followed by a toothed solid center link, $a'$, and this in turn by a link carrying the curved and toothed saddle $d$, and this again by the toothed center and side links described as preceding the saddle.

It will be seen that the teeth $e$ upon the extremities of the saddle are higher than the teeth $e'$ upon the links, by which arrangement the log is prevented from rolling and escaping from the bite of the link-teeth.

A portion of the chain is then left plain, the length of this portion which forms the intervals between each set of saddles and toothed links depending upon the length of logs the chain is intended to carry.

The chain heretofore described, and shown in the drawings as connecting the saddles, is made up of solid center links connected by side links; but it is evident any other style of chain may be used to form these connections, it being only necessary that the parts provided with teeth should be of the construction described.

Having thus described my invention, I claim as new, and desire to secure by Letters Patent, the following:

1. A jack-chain provided with the curved saddle $d$, having teeth $e$ at its extremities and teeth $e'$ between the teeth $e$, as described, for the purpose of retaining the log in position, as specified.

2. In a jack-chain, the combination of the curved and toothed saddles with the toothed links $a'$ and $b'$, constructed and arranged substantially as shown and described.

3. In a jack-chain, the solid toothed center links $a'$, made of sufficient width to occupy the space between the toothed side links $b'$, in combination therewith and with the links $a$ and $b$, in the manner shown and described.

In testimony that I claim the foregoing as my own I hereunto affix my signature in presence of two witnesses.

JOHN BT. LEMIEUX.

Witnesses:
D. McLAUGHLIN,
JAMES CAVANAUGH.